United States Patent
Miyahara et al.

(10) Patent No.: US 7,094,867 B2
(45) Date of Patent: Aug. 22, 2006

(54) METHOD OF CONTINUOUSLY CLEANSING POLYARYLENE SULFIDE

(75) Inventors: Michihisa Miyahara, Fukushima-Ken (JP); Norio Saitou, Fukushima-Ken (JP); Mitsuhiro Matsuzaki, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 10/497,525

(22) PCT Filed: Nov. 29, 2002

(86) PCT No.: PCT/JP02/12513

§ 371 (c)(1),
(2), (4) Date: Jun. 3, 2004

(87) PCT Pub. No.: WO03/048231

PCT Pub. Date: Jun. 12, 2003

(65) Prior Publication Data

US 2005/0087215 A1 Apr. 28, 2005

(30) Foreign Application Priority Data

Dec. 3, 2001 (JP) .............................. 2001-368579

(51) Int. Cl.
*C08F 6/00* (2006.01)

(52) U.S. Cl. .................. 528/493; 264/176.1; 264/219; 525/185; 525/539; 528/480

(58) Field of Classification Search ................ 422/131; 528/373, 493; 134/32
See application file for complete search history.

(56) References Cited

U.S. PATENT DOCUMENTS

| | | | |
|---|---|---|---|
| 4,110,401 A | 8/1978 | Hoover et al. | |
| 4,163,837 A | 8/1979 | Rush | |
| 4,639,507 A | 1/1987 | Alewelt et al. | |
| 5,166,446 A * | 11/1992 | Barentsen et al. | 568/56 |
| 5,316,223 A | 5/1994 | Lahoda et al. | |
| 5,814,210 A * | 9/1998 | Yoon et al. | 209/164 |
| 6,331,608 B1 * | 12/2001 | Vidaurri et al. | 528/388 |
| 6,734,282 B1 * | 5/2004 | Wagener et al. | 528/480 |

FOREIGN PATENT DOCUMENTS

| | | |
|---|---|---|
| DE | 41 02 745 | 8/1992 |
| EP | 0 101 907 | 3/1984 |
| JP | 2-102228 | 4/1990 |
| JP | 3-86287 | 4/1991 |
| JP | 4-139215 | 5/1992 |
| WO | 00/61659 | 10/2000 |
| WO | 01/70852 A1 | 9/2001 |

* cited by examiner

*Primary Examiner*—Terressa Boykin
(74) *Attorney, Agent, or Firm*—Wenderoth, Lind & Ponack, L.L.P.

(57) ABSTRACT

A polymerizate slurry obtained through a reaction of an alkali sulfide source and an aromatic dihalide compound in an organic polar solvent and comprising polyarylene sulfide particles, a by-produced alkali metal salt and the polar organic solvent, is continuously contacted countercurrently with a washing liquid, thereby continuously and efficiently recovering washed polyarylene sulfide particles. Furthermore, the by-produced alkali metal salt is removed, and the polar organic solvent is recovered, efficiently.

12 Claims, 3 Drawing Sheets

METHOD OF CONTINUOUSLY CLEANSING POLYARYLENE SULFIDE

TECHNICAL FIELD

The present invention relates to a process for treating a slurry containing at least two types of solid particles, particularly a process for effectively washing a polymerizate slurry containing polyarylene sulfide particles obtained by reacting an alkali sulfide source and an aromatic dihalide compound in a polar organic solvent, or an effective process for treating such a polymerizate slurry.

BACKGROUND ART

A polyarylene sulfide [PAS] resin as represented by polyphenylene sulfide is an engineering plastic excellent in heat resistance, chemical resistance, non-flammability, electrical properties and mechanical properties, and is widely used as materials for fiber, films, injection molding and extrusion. The production of a PAS resin through a process of reacting an aromatic dihalide compound and an alkali metal sulfide in an organic polar solvent, such as N-methylpyrrolidone (NMP), is described, e.g., in Japanese Patent Publication (JP-B) 52-12240. According to the process, a polymerization system in a high-temperature state is withdrawn by flushing into a vessel under a normal or reduced pressure, and is then subjected to recovery of the solvent, washing and drying to recover the resin, thereby finally obtaining a powdery resin product having particle sizes of from several μm to 50 μm. The powdery resin in a dry state is liable to be scattered as dust and is difficult to handle because of a small bulk density. Particularly, the powdery resin is liable to show inferior production efficiency because of a lowering in throughput at the time of melt-extrusion. Further, a PAS resin is generally provided with a level of melt-viscosity necessary for processing through so-called hot cross-linking in a step after the drying, so that the PAS resin is liable to exhibit inferior mechanical or physical properties than linear polymers.

Japanese Laid-Open Patent Application (JP-A)59-49232 has disclosed a process for processing particulate PPS, and in its Examples, the polymerizate is discharged into water, and precipitated polymer beads are recovered and subjected to a repetition of washing with warm water.

For a similar resin, JP-A 61-255933 has disclosed a process for treating a polymerizate slurry obtained in the polymerization step and containing a particulate PAS. The treating process includes: (1) a step wherein a polymerizate slurry containing polyarylene sulfide particles, by-produced crystalline and dissolved alkali chloride and arylene sulfide oligomers together with the liquid component principally comprising N-methylpyrrolidone, is subjected to sieving for separation into polyarylene sulfide particles and a slurry containing crystallized alkali chloride, (2) a step wherein the slurry containing crystallized alkali chloride is subjected to solid-liquid separation to recover crystallized alkali chloride, while the liquid component is distilled to recover N-methylpyrrolidone, (3) a step of washing the polyarylene sulfide particles with an organic solvent, such as acetone, and water, and (4) a step of distilling the organic solvent washing liquid to recover the organic solvent.

JP-A4-139215 has disclosed a process for washing polyarylene sulfide, wherein polyarylene sulfide particles recovered by sieving from a polymerizate slurry are successively washed with an organic solvent, such as acetone, having a lower boiling point than water miscible with water and polar organic solvent in the polymerizate slurry, and then with water.

The above-mentioned conventional processes for recovery by washing of product polyarylene sulfide particles from a polymerizate slurry involve an essential problem accompanying a principal step comprising separation and recovery of polyarylene sulfide particles from the polymerizate slurry relying on sieving or filtration.

More specifically, in any of the above-mentioned processes, an objective polymerizate slurry containing polyarylene sulfide particles obtained by reaction of an alkali sulfide source and an aromatic dihalide compound in a polar organic solvent, contains not only polyarylene sulfide particles having an average particle size on the order of 200–2000 μm, as a principal object of recovery, but also a polar organic solvent, by-produced alkali metal salt fine particles, dissolved alkali metal salt and arylene sulfide oligomer. Such a large number of components in the polymerizate slurry provide an essential difficulty in separation and recovery of product PAS particles, and particularly many problems are encountered in the above-mentioned separation-recovery process including the sieving or filtration as an essential step.

For example, the above-mentioned processes disclosed by JP-A 61-255933 and JP-A4-139215 both include a step of sieving the polymerizate slurry by using a sieve having a mesh-opening of ca.105 μm so as to recover PAS particles on the sieve while transferring the by-produced alkali metal salt fine particles to the filtrate liquid. It is inevitable to lose PAS particles having particle sizes passing through the sieve mesh-opening, and if the mesh-opening is decreased so as to reduce the loss, the separation between the PAS particles and the alkali metal salt fine particles becomes difficult and requires an excessively long time for the filtration, thus making the process commercially unfeasible. Further, the processes are also accompanied with much difficulty in recovery of the polar organic solvent that is a costly reaction solvent from the filtrate liquid containing the by-produced alkali metal salt fine particles.

DISCLOSURE OF INVENTION

A principal object of the present invention is to provide a process which does not include a commercially problematic sieving step as an essential step but can effectively recover PAS particles from a polymerizate slurry as mentioned above.

Another object of the present invention is to provide a process for treating a PAS polymerizate slurry which also takes into account effective recovery of a polar organic solvent that is a costly reaction solvent, and allows effective separation and removal of by-produced alkali metal salt.

Another object of the present invention is to provide a process for effectively washing PAS particles with a reduced amount of washing liquid.

A further object of the present invention is to provide an effective process for treating a slurry containing at least two types of solid particles, like a PAS polymerizate slurry as mentioned above.

According to our study for accomplishing the above-mentioned objects, it has been found very effective to adopt a process including continuous countercurrent contact with a washing liquid for recovering PAS particles from a polymerizate slurry containing the PAS particles.

Thus, according to the present invention, there is provided a process for continuously washing PAS, comprising: a washing step of subjecting a polymerizate slurry to continuous countercurrent contact with a washing liquid; said polymerizate slurry containing PAS particles, a by-produced alkali metal salt and a polar organic solvent and obtained through a reaction of an alkali sulfide source and an aromatic dihalide compound in the polar organic solvent.

More specifically, it has been found that the above-mentioned washing process or PAS polymerizate slurry-treatment process including countercurrent contact with a washing liquid is not only industrially excellent in that it allows continuous processing of the polymerizate slurry but also capable of reducing the loss of PAS fine particles as encountered in recovery by sieving separation from by-produced alkali metal salt fine particles. Further, according to a preferred embodiment of the continuous process for washing polyarylene sulfide according to the present invention, it becomes possible to achieve efficient recovery of the costly polar organic solvent and efficient removal by separation of the by-produced alkali metal salt.

According to another aspect of the present invention, there is provided a process for treating a slurry, comprising: subjecting a slurry comprising a dispersion liquid medium and at least two types of solid particles dispersed in the liquid medium to sequential washing steps including: a first washing step of washing the slurry by countercurrent contact with a first washing liquid which does not dissolve any of the solid particles but is miscible with the dispersion liquid medium, and a second washing step of bringing the washed at least two types of solid particles into contact with a second washing liquid which selectively dissolves a part of the at least two types of solid particles and is also miscible with the first washing liquid. As a result it becomes possible to efficiently wash preferably one species of solid particles and efficiently treat the washing waste liquid.

BEST MODE FOR PRACTICING THE INVENTION

Some preferred embodiments of the present invention are described with reference to the drawings.

Figure 1:
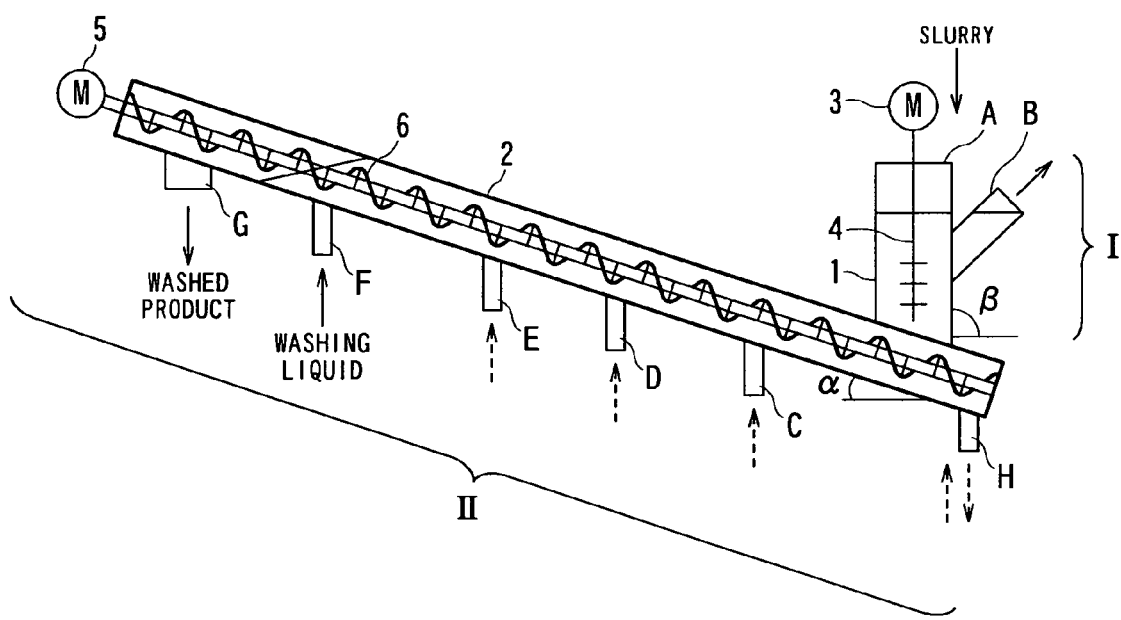
FIG. 1 is a schematic illustration of an embodiment of washing apparatus suitable for practicing a process of the invention.

FIG. 1 is a schematic illustration of an embodiment of washing apparatus suitable for practicing a process of the present invention. Referring to FIG. 1, the washing apparatus is roughly divided into a downward tube section I and an upward tube section II for flowing PAS particles downwards and upwards, respectively. The downward tube section I and the upward tube section II comprise hollow tubes 1 and 2, respectively. Inside the downward tube 1 is disposed a stirrer 4 driven by a motor 3, and inside the upward tube 2 is disposed a screw 6 driven by a motor 5 for carrying or scooping up the PAS particles. The apparatus is provided with a supply port and a discharge port at positions arbitrarily selected from A to H. More specifically, at A is provided a supply port for a material to be washed; F, a principal supply port for a washing liquid; G, a discharge port for washed PAS particles; B, a discharge port for a washing waste liquid; C, D and E, optionally provided auxiliary supply ports for washing liquids; and H, an optionally provided temporary discharge port. An auxiliary supply port can also be provided between the PAS particle-discharge port G and the principal washing liquid-supply port F, or/and to the downward tube section I.

The downward tube 1 is vertical and the upward tube 2 is inclined in the embodiment of FIG. 1, but each of them can be either vertical or inclined. In the downward tube 1, depending on a specific gravity difference between the PAS and by-produced alkali metal salt particles and the washing liquid, the particles descend and the washing liquid ascends to cause countercurrent contact or sedimentation between them. In order to prevent localized flow or channeling of the ascending washing liquid, it is preferred to effect mild stirring by the stirrer 4. It is however possible to omit the stirrer 4 if the stirring effect is not particularly expected. On the other hand, in the upward tube 2, particles inclusive of the PAS particles are carried up by the screw 6 while being washed with the washing liquid. In order to provide a good harmonization between the conveyability of the particles by the carrying-up and the washing effect, the upward tube 2 may be inclined with respect to the horizontal plane at an angle $\alpha$, which may be appropriately selected from a range of generally 1–90 deg., preferably 5–60 deg., further preferably 15–45 deg. The downward tube 1 can also be inclined with respect to the horizontal plane at an angle $\beta$ appropriately selected from a range of 1–90 deg., preferably 5–90 deg., for the purpose of moderation of the sedimentation velocity, improving the washing efficiency, or providing a compact apparatus in combination with the upward tube 2.

The apparatus of FIG. 1 may generally be operated as an open system under the atmospheric pressure, but can be placed under an elevated or reduced pressure.

PAS polymerizate slurry supplied through the port A is first described.

PAS polymerizate slurry to be processed or treated by the present invention is a polymerizate slurry containing polyarylene sulfide particles, a by-produced alkali metal salt and a polar organic solvent and obtained through a reaction of an alkali sulfide source and an aromatic dihalide compound in the polar organic solvent.

(a) Polar Organic Solvent

The polar organic solvent may, for example, include organic amide compounds, lactam compounds, urea compounds, and cyclic organic phosphorus compounds. Specific examples thereof may include: N,N-dimethylformamide, N,N-dimethylacetamide, N,N-diethylacetamide, N,N-dipropylacetamide, N,N-dimethylbenzamide, caprolactam, N-methylcaprolactam, N-ethylcaprolactam, N-isopropylcaprolactam, N-isobutylcaprolactam, N-n-propylcaprolactam, N-n-butylcaprolactam, N-cyclohexylcaprolactam, N-methyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-cyclohexyl-2-pyrrolidone, N-ethyl-3-methyl-2-pyrrolidone, N-methyl-3,4,5-trimethyl-2-pyrrolidone, N-methyl-2-piperidone, N-isopropyl-2-piperidone, N-methyl-2-piperidone, N-ethyl-2-piperidone, N-isopropyl-2-piperidone, N-methyl-6-methyl-2-piperidone, N-methyl-3-ethyl-2-piperidone, tetramethylurea, N,N'-dimethylethyleneurea, N,N'-dimethylpropyleneurea, 1-methyl-1-oxosulfolane, 1-ethyl- 1-oxosulfolane, 1-phenyl-1-oxosulfolane, 1-methyl-1-oxosulfolane, 1-n-propyl-1-oxosulfolane, and 1-phenyl-1-oxosulfolane.

The polar organic solvents may be used singly or in mixture of two or more species.

Among the various polar organic solvents, aprotic organic amides and lactams are preferred, and among these, N-alkyllactams and N-alkylpyrrolidones are preferred, of which N-methyl-2-pyrrolidone (NMP) is particularly suitable.

(b) Alkali Sulfide Source

The alkali sulfide source (compound) is a material functioning as a sulfur source for the product PAS. Examples thereof include: alkali sulfides and also alkali hydrosulfides. More specifically, examples of alkali sulfides may include: lithium sulfide, sodium sulfide, potassium sulfide, rubidium sulfide, and cesium sulfide. Among these, sodium sulfide and lithium sulfide are preferred, and sodium sulfide is particularly preferred. Further, examples of alkali hydrosulfides may include: lithium hydrosulfide, sodium hydrosulfide, potassium hydrosulfide, rubidium hydrosulfide, calcium hydrosulfide and cesium hydrosulfide. Among these, sodium hydrosulfide and lithium hydrosulfide are preferred, and sodium hydrosulfide is particularly preferred. In the case of using an alkali hydrosulfide, it is preferred to co-use an alkali hydroxide.

(c) Aromatic Dihalide Compound

Examples of the aromatic dihalide compound as a starting monomer may include: dihalobenzenes, such as m-dihalobenzene and p-dihalobenzene, alkyl-substituted dihalobenzenes and cycloalkyl-substituted dihalobenzenes, such as 2,3-dihalotoluene, 2,5-dihalotoluene, 2,6-dihalotoluene, 3,4-dihalotoluene, 2,5-dihaloxylene, 1-ethyl-2,5-dihalobenzene, 1,2,4,5-tetramethyl-3,6-dihalobenzene, 1-normal-hexyl-2,5-dihalobenzene and 1-cyclohexyl-2,5-dihalobenzene; aryl-substituted dihalobenzenes, such as 1-phenyl-2,5-dihalobenzene, 1-benzyl-2,5-dihalobenzene, and 1-p-toluyl-2,5-dihalobenzene; dihalobiphenyls, such as 4,4'-dihalobiphenyl; dihalonaphthalenes, such as 1,4-dihalonaphthalene, 1,6-dihalonaphthalene and 2,6-dihalonaphthalene; 3,5-dihalobenzoic acid, 4,4'-dihalodiphenyl ether, 4,4'-dihalodiphenyl sulfoxide.

The two halogen elements in these aromatic dihalide compounds may respectively be fluorine, chlorine, bromine or iodine, and may be identical or different from each other.

Among the above-mentioned aromatic dihalide compounds, dihalobenzenes are preferred, and one principally comprising p-dichlorobenzene is particularly preferred.

(d) Reaction

As for the reaction processes using the respective components described above, those known for producing PAS may appropriately be adopted, but processes capable of providing PAS particles having an average particle size of 100 μm or larger are desirably used. For example, a process disclosed in JP-A61-7332 may be used. In the process, an alkali sulfide source and an aromatic dihalide compound is subjected to two stages of polymerization in a polar organic solvent. More specifically, one mol of charged alkali sulfide source is first reacted with an aromatic dihalide compound at 180–235° C. in a medium comprising 0.2–5 liters of polar organic solvent and 0.5–2.4 mols of water until a conversion of 50–95 mol % of the aromatic dihalide compound, and is then further reacted at 245–290° C. after addition of further water so as to provide 2.5–7.0 mols of water per mol of the charged alkali sulfide source, thereby producing particulate PAS. According to this process, it is possible to obtain a polymerizate slurry which is substantially free from PAS particles having particle sizes of below 100 μm and in which most of by-produced alkali metal salt is precipitated as fine particles providing an average particle size of ca.5–100 μm.

According to a particularly preferred embodiment, $Na_2S$ or NaHS (+NaOH) is used as the alkali sulfide source, p-dichlorobenzene is used as the aromatic dihalide compound and NMP is used as the polar organic solvent, to provide a PAS polymerizate slurry containing, in addition to product PPS particles, crystalline NaCl, dissolved NaCl, phenylene sulfide oligomer and paradichlorobenzene, together with the solvent NMP and water.

Now, several embodiments for treating a polyarylene sulfide polymerizate slurry as described above in the washing apparatus of FIG. 1, are described.

FIRST EMBODIMENT

In a most basic embodiment using an apparatus of FIG. 1 placed in an open atmospheric pressure system, a polymerizate slurry is supplied from the supply port A and water is supplied as a washing liquid from the principal washing liquid-supply port F, whereby washed PAS particles are discharged out of the discharge port G, and an aqueous waste fluid containing NMP, dissolved NaCl, dissolved phenylene sulfide oligomer and paradichlorobenzene, is discharged out of the discharge port B.

More specifically, solid matter principally comprising PAS particles, crystalline NaCl, etc., in the PAS polymerizate slurry supplied from the supply port A, is caused to flow down or descend preferably under mild stirring by means of stirring blades 4 through the downward tube 1 to reach the bottom of the tube 1, from which the solid matter is scooped up by a screw 6 rotated in the upward tube 2 while it is caused to countercurrently contact water supplied from the supply port F and the accompanying crystalline alkali metal salt is washed out therefrom. The solid matter is separated from water during further ascending in the tube 2 to be discharged out of the discharge port G and is dried thereafter to provide PAS particles. On the other hand, water as the washing liquid supplied from the supply port F dissolves the crystalline alkali metal salt accompanying the PAS particles and is accompanied with the dissolved alkali metal salt while extracting the polar organic solvent absorbed with the polyarylene sulfide particles. Then, the water is discharged out of the port B together with the polar organic solvent and arylene sulfide oligomer in the polymerizate slurry. The washing waste fluid is separated into respective components according to an ordinary method, such as distillation.

This embodiment generally utilizes the effective scrubbing function alone of the countercurrent washing apparatus of FIG. 1. As a result, the PAS particles discharged out of the port G can receive a sufficient washing effect, but this embodiment involves a difficulty that the presence of the alkali metal salt such as NaCl, dissolved in the washing waste fluid makes difficult the distillation for separating the respective components in the waste fluid. Particularly, it is very difficult to economically separate and recover the polar organic solvent from a mixture of the polar organic solvent which has a higher boiling point than water and is therefore withdrawn from the bottom of the distillation column together with the alkali metal salt and arylene sulfide oligomer.

SECOND EMBODIMENT

In a further preferred embodiment of the present invention, two units of the washing apparatus shown in FIG. 1 are disposed in series, and the polymerizate slurry is subjected to a two-stage washing process.

More specifically, in a first washing unit, similarly as in the above-embodiment, the polymerizate slurry is supplied from the port A, and from the port F is supplied a washing liquid comprising a polar organic solvent (e.g., acetone or methanol, hereinafter represented by acetone) which is miscible with water and the polar organic solvent (hereinafter represented by NMP) in the polymerizate slurry and has a lower boiling point than water, whereby NMP is principally extracted and washed out from the particulate PAS (hereinafter represented by PPS) to discharge a wet cake of PPS particles accompanied with the crystalline alkali metal salt (hereinafter represented by NaCl) out of the port G. On the other hand, from the port B is discharged a washing waste fluid principally comprising acetone, water and NMP.

Further, in a second washing unit also having a structure substantially similar as the one shown in FIG. 1, the wet cake of PPS particles discharged out of the port G and accompanied with the crystalline NaCl is supplied from the port A, and water is supplied from the port F as a washing liquid. As a result, principally in the process of the wet cake moving through the upward tube 2, the accompanying crystalline NaCl is removed by dissolution and the absorbed acetone is removed by extraction, respectively with water, from the PPS particles, whereby a wet cake of PPS particles substantially wetted with water alone is discharged out of the port G and then dried to provide product PPS particles. On the other hand, from the port B is discharged a washing waste fluid comprising water, recovered acetone and dissolved NaCl as major components. If this washing waste fluid is subjected to distillation, acetone is recovered from the column top, and from the column bottom is discharged aqueous NaCl solution which can be discharged as it is without further solid-liquid separation.

On the other hand, the washing waste fluid discharged out of the port B of the first washing unit comprises acetone, water and NMP as major components and a very small amount of dissolved NaCl, and therefore can be subjected to distillation without a substantial lowering in efficiency. More specifically, in the distillation column, acetone, water and NMP are distilled out respectively from top parts, and a small amount of NMP containing high-boiling point matter is withdrawn as bottom residue liquid at appropriate time from the bottom.

THIRD EMBODIMENT

In a further preferred embodiment, a third washing unit also having a structure substantially similar as the one shown in FIG. 1, is used to treat with an acid the wet cake of PPS particles discharged out of the port G of the second washing unit in Second embodiment described above. The acid treatment is effective for increasing crystallization temperature and crystallization speed as preferable features of product PPS particles as described in JP-A62-48728 and JP-A7-118389.

More specifically, in this embodiment, with reference to FIG. 1 again, the wet cake of PPS particles discharged out of the port G of the second washing unit is supplied from the port A of the third washing unit. On the other hand, from a port C of the third washing unit is supplied a solution of an acid (e.g., an inorganic acid, such as hydrochloric acid, sulfuric acid or phosphoric acid; a salt of strong acid and weak base, such as ammonium chloride; or an organic acid, such as acetic acid or formic acid) in water or a solvent mixture of water as a major ingredient with a water-miscible solvent, such as alcohol, and from a port F is supplied water, respectively as washing liquids. As a result, the PPS particles supplied from the port A are treated with the acid introduced through the port C while descending through the downward tube 1 and ascending in a section up to the supply port C of the upward tube 2, and are washed with water introduced through the port F while further ascending through the upward tube 2, followed by water draining on further ascending and discharging out of the port G as a wet cake, which is then dried to be recovered as the product of acid-treated PPS particles. The washing liquid from the discharge port B is a diluted acid that can be introduced into an acid recovery section or can be discharged out of the system as it is because it is substantially harmless.

Figure 2:
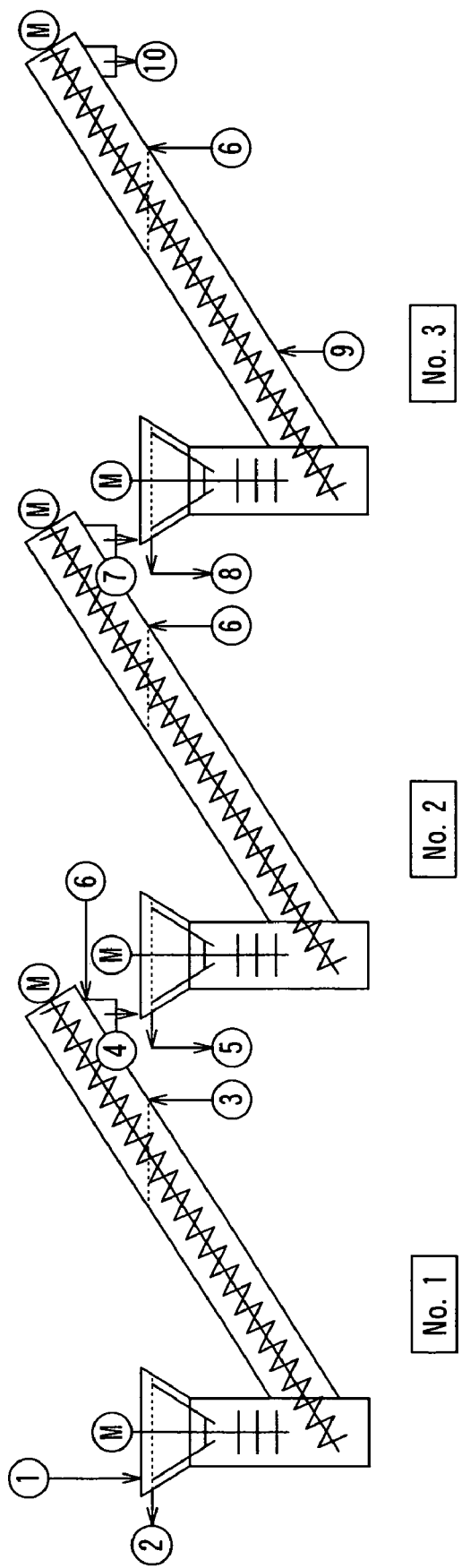
FIG. 2 is an illustration of representative materials appearing at respective inlets and outlets of an apparatus system including three units of the apparatus shown in FIG. 1 in series for practicing a preferred embodiment of the process of the invention.

The distribution of major components flowing into and out of the system may be summarized as shown in FIG. 2. The disposition of each washing unit is laterally reversed from the one shown in FIG. 1, but this is of course not a substantial difference.

Incidentally, in the apparatus system shown in FIG. 2, the top portion of each washing unit is enlarged like a hopper. This modification is effective for facilitating the introduction of feed materials and the separation of the feed and the washing waste fluid, and may also be applied to the washing apparatus shown in FIG. 1.

FOURTH EMBODIMENT

The process for washing treatment of PAS (represented by PPS) according to Third embodiment above can be practiced essentially with the washing apparatus of FIG. 1 alone if the upward tube 2 is elongated.

More specifically, in this embodiment, with reference to FIG. 1 again, the polymerizate slurry is supplied from the port A, and the PPS particles therein are successively washed with acetone supplied from the port C, water supplied from the port D, acid supplied from the port E and water supplied from the port F, and after water draining, are discharged out of the port G as a wet cake containing substantially water alone, followed by drying, to be recovered as an acid-treated particulate PPS product.

According to this embodiment, however, a washing waste fluid containing dissolved NaCl and NMP in addition to washing liquids including water, acetone and acid, is discharged out of the port B. This embodiment therefore leaves a difficulty in recovering acetone and NMP.

FIFTH EMBODIMENT

However, the effects of washing and washing waste fluid recovery attained in Third embodiment can be substantially similarly accomplished by a series of two units (not three units as in Third embodiment) including first and second washing units each having a substantially similar structure as shown in FIG. 1. More specifically, in the first washing unit according to this embodiment, acetone is supplied from the principal washing liquid supply port F, and the operation and function of the first washing unit are quite identical to those of the first washing unit in Third embodiment. Then, the washed PAS particles accompanied with NaCl and discharged out of the port G of the first washing unit are supplied to the second washing unit, wherein the PAS particles are successively washed with water, acid and water supplied from the ports C, D (or E) and F, respectively, to be discharge out of the port G, followed by drying, to provide an acid-treated particulate PAS product. On the other hand, a washing waste fluid comprising water, acid and acetone is discharged out of the port B of the second washing unit, and the washing waste fluid can be easily separated by distillation so as to recover acetone from the column top and discharge acidic water from the column bottom.

SIXTH EMBODIMENT

Figure 3:
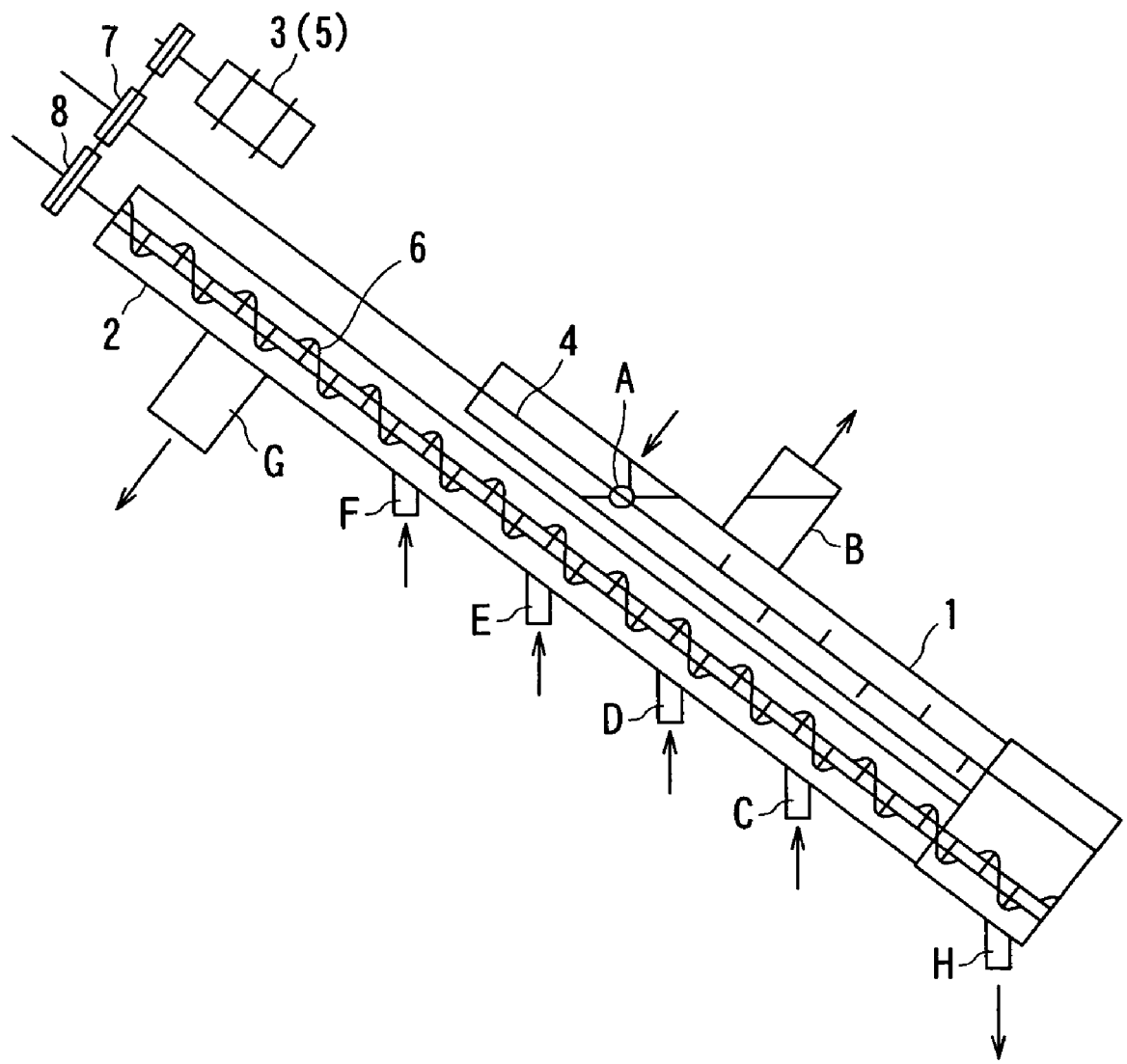
FIG. 3 is a schematic illustration of another embodiment of washing apparatus suitable for practicing a process of the invention.

The apparatus of FIG. 1 can be volumetrically compacted into an apparatus shown in FIG. 3, wherein like parts are denoted by identical symbols and numerals as in FIG. 1.

In the apparatus of FIG. 3 according to this embodiment, a downward tube 1 is inclined and disposed adjacent to an upward tube 2, whereby the apparatus can be made compact as a whole. A stirrer 4 and a screw 6 are driven by a common motor 3 via pulleys 7 and 8, respectively, but of course can be arranged to be driven with separate motors.

It is believed easily understandable that the washing of PAS by the apparatus of FIG. 3 can be substantially similarly accomplished as by the apparatus of FIG. 1.

SEVENTH EMBODIMENT

In any of the above-described embodiments, the feed slurry is introduced into the washing apparatus from the supply port A. However, it is also possible to introduce the feed slurry from the supply port C, D or H. Several effects are attained by introducing the feed slurry from a lower part of the upward tube 2 compared with the case of introduction from the supply port A. More specifically, (1) it is possible to solve a problem that particles settled at the bottom of the downward tube section I are agglomerated with each other to cause a localized flow of the washing liquid. (2) The slurry introduced from the port C, D or H is immediately subjected to stirring by the screw 6, so that the washing liquid and the slurry can be mixed in a short time to quickly wet the surface of the PAS particles with the washing liquid. (3) The stirrer 4 in the downward tube section I is unnecessitated, so that the downward tube 1 can be simplified, e.g., made smaller in size.

EIGHTH EMBODIMENT

It is also possible to blend a portion of washing liquid, e.g., acetone, with the feed PAS polymerizate slurry in advance. As a result, the surface of the particles in the feed slurry wetted with the washing liquid, such as acetone, whereby the difference in specific gravity between the solid and the liquid can be enlarge and the liquid viscosity can be lowered. Accordingly, the initial speed of sedimentation of the particles after the introduction of the polymerizate slurry to the supply port of the washing apparatus of FIG. 1 becomes faster in case where acetone is blended with the polymerizate slurry than in the case of no blending, whereby the overall sedimentation speed until the completion of the sedimentation after the introduction of the polymerizate slurry into the downward tube can be increased in the case of blending of acetone with the polymerizate slurry.

NINTH EMBODIMENT

It is possible to subject the feed PAS polymerizate slurry to solid-liquid separation in advance of the introduction of the slurry to the supply port A, etc., of the washing apparatus of FIG. 1. The solid-liquid separation may for example be accomplished by introducing the polymerizate slurry into the port A of an apparatus having a structure as shown in FIG. A without particularly introducing a washing liquid to obtain a polymerizate slurry of a reduced polar organic solvent content, and again introducing the polymerizate slurry to a supply port A, etc., of a washing apparatus as shown in FIG. 1. For the solid-liquid separation, it is also possible to apply ordinary means, such as sieving or centrifugation, in addition to the above. As a result, the proportion of the polar organic solvent in the slurry is reduced, whereby (1) the difference in specific gravity between solid and liquid is increased to provide a larger sedimentation speed of the particles, so that the diameter of the downward tube can be reduced. (2) The amount of used washing liquid, such as acetone, can be reduced. A washing solvent, such as acetone, is relatively expensive and is therefore recovered by distillation, etc., of which the cost can be reduced according to this embodiment.

EXAMPLE

Hereinbelow, the present invention will be described more specifically with reference to Examples and Comparative Examples.

Preparation of Polymerizate Slurry

A 200 liter-autoclave(reaction vessel) was charged with 60 kg of NMP and 38 kg of sodium sulfide penta-hydrate containing 46.30 wt. % of sodium sulfide ($Na_2S$), and after aeration with nitrogen gas, gradually elevated to a temperature of 200° C. under stirring within 3.5 hours to distil out 16.5 kg of water and 11 kg of NMP while 5.0 mols of $H_2S$ was removed by vaporization. Accordingly, the effective amount of $Na_2S$ remaining in the vessel after the dehydration step was 220.4 mols. The amount of the vaporized $H_2S$ corresponded to 2.22 mol % of the charged $Na_2S$. After the dehydration step, the reaction vessel containing 220.4 mols of effective $Na_2S$ was cooled to 180° C., and further charged with 34.35 kg of paradichlorobenzene (p-DCB)[p-DCB/$Na_2S$=1.06 (by mol)], 28.15 kg of NMP, 1.83 kg of water [(total water in the vessel)/$Na_2S$=1.40 (by mol) and 133 g of NaOH (at a purity of 97%) so as to provide a total amount of NaOH in the vessel in a proportion of 6.00 mol % of the effective $Na_2S$. Under stirring, the system was subjected to reaction for 4.5 hours at 220° C., and on further continuation of stirring, further charged with 4.17 kg of pressurized water as a phase separation agent [total water in the vessel/$Na_2S$=2.45 (by mol)], followed by heating to 255° C. and 2.0 hours of reaction. The total polymerization time amounted to 6.5 hours. After completion of the polymerization, the power supply to the heater was turned off, and the system was cooled to room temperature, whereby a polymerizate slurry containing PPS particles having an average particle size of ca.400 μm.

Example 1-1

The above-obtained polymerizate slurry was continuously processed by an apparatus having a structure essentially as shown in FIG. 1. The apparatus included a downward tube 1 comprising a vertical hollow tube having an enlarged top portion and a straight tube portion of 70 mm in inner diameter giving a total length of ca. 1 m, and a stirrer 4 was rotated at 8 rpm. An upward tube 2 comprised a hollow tube of 70 mm in inner diameter and 2 m in length and was disposed at an inclination angle α=ca.30 dg. A screw 6 had a length of 2 m, an outer diameter of 65 mm, a shaft diameter of 24 mm and a pitch of 60 mm and was rotated at 8 rpm.

By using the apparatus, the above-described polymerizate slurry was continuously supplied at a rate of 510 g/min from a port A, and acetone was introduced at a rate of 220 g/min. from a port F disposed at a position of ca.500 mm from the upper end of the upward tube 2. Under the conditions, 100 kg of the polymerizate slurry (containing 16.4 kg of PPS, 17.8 kg of NaCl and 56.9 kg of NMP) was processed for washing, whereby 15.8 kg of PPS and 17.3 kg of NaCl were recovered in a wet cake state (PPS recovery rate: 96%, NaCl recovery rate: 97%) from a port G disposed at a position of ca. 100 mm from the upper end of the upward tube 2. The weight of acetone used for the washing was 2.7 times the weight of PPS. As a result of analysis, the wet cake contained 34.7 wt. % of PPS, 38.0 wt. % of NaCl, 0.15 wt. % of NMP, 0.06 wt. % of p-DCB and the remainder principally comprising acetone. On the other hand, a washing waste fluid was discharged from a port B disposed at a position of ca. 900 mm from the upper end of the downward tube 1 and was found to be free from PPS particles of over 150 μm. By filtration of the washing waste fluid with a No. 5A filter paper, 1.2 kg of wet cake remained on the filter paper including 0.3 kg of by-produced crystalline alkali metal salt and 0.5 kg of PPS.

To the wet cake discharged from the port G, 60 kg of water (3.8 times the weight of PPS) was added so as to provide a 15 wt. % concentration of PPS, thereby providing an aqueous slurry (i.e., re-slurrying), and the aqueous slurry was processed by an apparatus having a structure as shown in FIG. 1 and having the same dimensions and operated under the same conditions as described above.

More specifically, the above aqueous slurry was supplied at a rate of 540 g/min. from the port A and water was supplied at a rate of 250 g/min. from the port F, respectively continuously. As a result of washing of 100 kg of the aqueous slurry (PPS: 15 kg, NaCl: 16.4 kg), 14.9 kg of PPS was recovered in a wet cake state from the port G. (PPS recovery rate: 99%) The weight of water used for the washing was 3.1 times that of the polymer giving a total amount of water of 6.9 times the weight of the polymer together with the 3.8 times amount of water used for the re-slurrying. As a result of analysis, the wet cake contained 31.2 wt. % of PPS, 0.5 wt. % of acetone and the remainder principally comprising water. The wet cake thus obtained was dried for 13 hours in an oven at 105° C. The dried particles exhibited an NMP concentration of 200 ppm, an Na$^+$ concentration of 1300 ppm and a polymer crystallization temperature on temperature decrease of 185° C. The amount of PPS recovered through the two times of continuous washing operation was 95% of PPS contained in the polymerizate slurry.

Example 1-2

The wet cake after the washing with water obtained in Example 1-1 described above, was then successively processed by an apparatus shown in FIG. 1, having the same dimensions as those used in Example 1-1 and further including a supply port C at a position of 50 mm from the lower end of the upward tube 2. The screw 6 was rotated at 10 rpm for the processing. More specifically, the wet cake was supplied at a rate of 260 g/min (polymer: 81 g/min.) from the port A, water was supplied at 200 g/min. from the port F, and 80 wt. % concentration-acetic acid was supplied at a flow rate of 0.75 g/min. (so as to provide a proportion of 0.3 wt. % of the washing water) from the port C, respectively continuously. As a result, the water used was 2.5 times the polymer, and the acetic acid was used in 0.74 g per 100 g of the polymer. The wet cake was dried for 13 hours in an oven at 105° C. to provide a polymer exhibiting a crystallization temperature on temperature decrease of 248° C.

Comparative Example 1-1

The above-obtained polymerizate slurry in 2700 g (PPS: 443 g, NaCl: 481 g and NMP: 1536 g) was first sieved through a screen having a mesh opening of 150 μm to separate and recover a particulate polymer, whereby a wet cake was obtained in 1000 g, which contained 40 wt. % of PPS. To the wet cake, 2000 g of acetone was added, and the mixture was stirred at room temperature and then subjected to sieving in a similar manner. The resultant cake after the sieving contained 50 wt. % of PPS. The same operation was repeated further two times for washing of the polymer. The total amount of acetone used amounted to 15 times that of the polymer. The wet cake obtained after the washing with acetone contained 0.2 wt. % of NMP. The wet cake was then subjected to 5 times of washing with water in a similar manner of operation as in the above-mentioned washing with acetone. The total amount of water thus used was 10000 g that was 22.6 times the polymer weight. Thereafter, the wet cake after water draining was dried for 13 hours in an oven at 105° C. As a result, 400 g of PPS was recovered (PPS recovery rate: 90%). The dried particles exhibited an NMP concentration of 220 ppm, an Na$^+$ concentration of 1700 ppm, and a polymer crystallization temperature on temperature decrease of 185° C.

Further, for the purpose of recovering NMP also from the by-produced crystalline alkali metal salt separated by the sieving, the filtrate liquid after the acetone washing was subjected to solid-liquid separation by using a No.5A filter paper instead of the screen, thereby obtaining 330 g of a wet cake, which contained 220 g of by-produced crystalline alkali metal salt and 40 g of PPS. To the wet cake, 1000 g of acetone was added, and the mixture was stirred and then drained. The solid matter obtained after the draining exhibited an NMP content of 5000 ppm attached thereto. With respect to the polymer weight, the total amount of acetone was ca.17.5 times, and that of water was 25 times.

Comparative Example 1-2

To the wet cake (containing 400 g of PPS) obtained after the 5 times of washing with water in Comparative Example 1-1, 2000 g of water was added and further 6 g of acetic acid was added so as to provide an acetic acid concentration of 0.3% with respect to the washing water thus added, and the mixture was stirred for washing the polymer. After the washing, the mixture was drained by a net having a mesh opening of 50 μm. The resultant wet cake was further stirred together with 2000 g of water added again thereto and then drained. The washing operation was repeated once more, and the resultant wet cake was dried for 13 hours in an oven at 105° C. to obtain a dried polymer exhibiting a crystallization temperature on temperature decrease of 248° C. For the washing, water was used in 15 times the polymer weight and acetic acid was used in 1.5 g per 100 g of the polymer.

Comparative Example 1-3

To the wet cake (containing 400 g of PPS) obtained after the 5 times of washing with water in Comparative Example 1-1, 2000 g of water was added and further 2.96 g of acetic acid was added, and the mixture was stirred for washing the polymer. After the washing, the mixture was drained by a net having a mesh opening of 150 μm. The resultant wet cake was further stirred together with 2000 g of water added again thereto and then drained. The washing operation was repeated once more, and the resultant wet cake was dried for 13 hours in an oven at 105° C. to obtain a dried polymer exhibiting a crystallization temperature on temperature decrease of 194° C. For the washing, water was used in 15 times the polymer weight and acetic acid was used in 0.74 g per 100 g of the polymer.

Example 2

The same polymerizate slurry as used in Example 1-1 was continuously processed by an apparatus having a structure similar to the one shown in FIG. 1. The apparatus included a downward tube 1 which was composed of a straight tube alone with no stirrer therein and disposed as a hollow vertical tube having an inner diameter of 70 mm and an overall length of 1 m. The upward tube 2 was a hollow tube disposed at an inclination angle α=20 deg. and having an inner diameter of 70 mm and a length of 3 mm, and contained a screw 6 having a length of 3 m, an outer diameter of 65 mm, a shaft diameter of 24 mm and a pitch of 60 mm. The screw 6 was rotated at 5 rpm. The polymerizate slurry was supplied directly to a lower end (at a position of H in FIG. 1) of the upward tube having a scooping screw therein. The polymerizate slurry was supplied at 250 g/min., and acetone was supplied at 200 g/min. from a position of F (ca.1000 mm from the upper end of the upward tube 2) in FIG. 1. Under the conditions, 100 kg of the polymerizate slurry (containing 16.4 kg of PPS, 17.8 kg of NaCl and 56.9 kg of NMP) was processed for washing, whereby 528.8 kg of wet cake was obtained from a discharge port G at a position of ca.100 mm from the upper end of the upward tube 2. As a result of analysis, the wet cake contained 15.7 kg of PPS, 17.3 kg NaCl, 0.076 kg of NMP, 0.015 kg of p-DCB and the remainder principally comprising acetone. The PPS recovery rate was 96%, and NaCl recovery rate 97%. The weight of acetone used for the washing was 4.9 times the PPS weight.

On the other hand, a washing waste fluid was discharged from the port B and was formed to contain 0.7 kg of PPS and 0.5 kg of NaCl.

Example 3

The same polymerizate slurry as used in Example 2 in 100 kg (containing 16.4 kg of PPS, 17.8 kg of NaCl and 56.9 kg of NMP) was preliminarily blended with 40 kg of acetone as a washing solvent, and the mixture was continuously supplied at a rate of 350 g/min. from the top port A of the downward tube 1 in the apparatus of FIG. 1. Acetone was also supplied at a rate of 100 g/min. from the port F in FIG. 1. The other conditions were the same as in Example 2.

As a result, 51.5 kg of a wet cake was obtained from the port G, and on analysis, was found to contain 15.8 kg of PPS, 17.2 kg of NaCl, 0.1 kg of NMP, 0.015 kg of p-DCB and the remainder of acetone. PPS recovery rate was 96, and NaCl recovery rate was 97%. On the other hand, the washing waste fluid discharged out of the port B contained 0.6 kg of PPS and 0.6 kg of NaCl.

Reference Example

A similar polymerizate slurry was preliminarily blended with a portion of acetone as a washing liquid and then continuously processed in the apparatus shown in FIG. 1. In this instance, however, no acetone was supplied as a countercurrently flowing washing solvent, whereby the apparatus was used as a solid-liquid separation apparatus.

More specifically, 100 kg of polymerizate slurry (containing 16.4 kg of PPS, 17.8 kg of NaCl and 56.9 kg of NMP) was preliminarily blended with acetone in a weight ratio of polymerizate slurry/acetone=250/130 (by weight), and the mixture was supplied to the top A of the downward tube 1 in the apparatus of FIG. 1. From the discharge port G, 15.9 kg of PPS and 17.4 kg of NaCl were recovered (PPS recovery rate: 97%, NaCl recovery rate: 98%). In this instance, the weight of acetone used was 3.1 times that of PPS as a result of analysis. The wet cake was found to contain 28.3 wt. % of PPS, 23.0 wt. % of NaCl, 20.3 wt. % of NMP, 0.14 wt. % of p-DCB, and the remainder principally of acetone.

INDUSTRIAL APPLICABILITY

As is apparent from the results the above-described Examples and Comparative Examples, according to the present invention, there is provided a commercially effective process for continuously washing polyarylene sulfide (PAS) or method of processing PAS polymerizate slurry which (a) does not include a commercially problematic sieving step as an essential step and (b) is capable of effectively washing PAS particles with a small amount of washing liquid and also envisages the effective recovery of a polar organic solvent that is an expensive solvent and the effective removal of by-produced alkali metal salt.

The invention claimed is:

1. A process for continuously washing polyarylene sulfide, comprising a washing step of subjecting a polymerizate slurry to continuous countercurrent contact with a washing liquid; said polymerizate slurry containing polyarylene sulfide particles, a by-produced alkali metal salt and a polar organic solvent and obtained through a reaction of an alkali sulfide source and an aromatic dihalide compound in the polar organic solvent; wherein the washing step includes a step of moving the polyarylene sulfide particles as an upward flow countercurrently contacting the washing liquid, and the process further includes a step of continuing the upward flow of the polyarylene sulfide particles to separate the washing liquid therefrom and recover the polyarylene sulfide particles.

2. A process according to claim 1, wherein the washing step includes a former step of moving the polyarylene sulfide particles as a downward flow countercurrently contacting the washing liquid, and a latter step of moving the polyarylene sulfide particles as an upward flow countercurrently contacting the washing liquid.

3. A process according to claim 2, wherein the latter step is operated in an inclined tube provided with a conveying screw.

4. A process according to claim 2, wherein in the latter step, at a point intermediate the upward flow of the polyarylene sulfide particles, the washing liquid is introduced and caused to start contacting the polyarylene sulfide particles.

5. A process according to claim 1, wherein the washing step is performed in a generally V-shaped tubular apparatus including a downward tube and an upward tube provided with a conveying screw inside whereof; the polymerizate slurry is introduced at a point proximate to a lowermost part of the upward tube of the tubular apparatus so that the polyarylene sulfide particles are countercurrently contacted with the washing liquid; the washed polyarylene sulfide particles are recovered together with the by-produced alkali metal salt from a point proximate to a top of the upward tube; and a mixture liquid comprising the washing liquid and the polar organic solvent is recovered from a point proximate to a top of the downward tube.

6. A process according to claim 1, wherein in the washing step, an organic solvent miscible with the polar organic solvent and water and having a lower boiling point than water is used as the washing liquid to recover the washed polyarylene sulfide particles accompanied with the by-produced alkali metal salt; and a second washing step is further included, wherein the thus-recovered polyarylene sulfide particles accompanied with the by-produced alkali metal salt are continuously and countercurrently contacted with an aqueous washing liquid to wash and recover the polyarylene sulfide particles.

7. A process according to claim 1, further including a third washing step and a fourth washing step for sequentially washing the washed polyarylene sulfide particles with an acidic washing liquid and an aqueous washing liquid, respectively, countercurrently contacting the polyarylene sulfide particles.

8. A process according to claim 1, further including prior to the washing step a preliminary (solid-liquid separation) step operated in a generally V-shaped tubular apparatus including a downward tube and an upward tube provided inside thereof with a conveying screw, wherein the polymerizate slurry is introduced at a point proximate to a top of the downward tube, and the polymerizate slurry with a reduced amount of the polar organic solvent is recovered from a point proximate to a top of the upward tube and supplied to the washing step.

9. A process according to claim 1, further including prior to the washing step a preliminary step of mixing the polymerizate slurry with a portion of the washing liquid.

10. A process for treating a slurry, comprising: subjecting a slurry comprising a dispersion liquid medium and at least two types of solid particles dispersed in the liquid medium to sequential washing steps including:

a first washing step of washing the slurry by countercurrent contact with a first washing liquid which does not dissolve any of the solid particles but is miscible with the dispersion liquid medium, and a second washing step of bringing the washed at least two types of solid particles into contact with a second washing liquid which selectively dissolves a part of the at least two types of solid particles and is also miscible with the first washing liquid;

wherein at least one of the first and second washing steps comprises a step of moving said at least two types of solid particles as an upward flow countercurrently contacting the washing liquid, and the process further includes a step of continuing the upward flow of the solid particles to separate the washing liquid therefrom the recover the solid particles.

11. A process according to claim 10, wherein at least one of the first and second washing steps includes as a latter step a step of moving said at least two types of solid particles as an upward flow countercurrently contacting the washing liquid, and further as a former step preceding thereto a step of moving at least two types of solid particles as a downward flow countercurrently contacting the washing liquid.

12. A process according to claim 11, wherein the latter step is operated in an inclined tube provided with a conveying screw.

* * * * *